Jan. 8, 1924.
R. A. JOYNER
MANUFACTURE OF HYDRAZINE
Filed Jan. 18, 1923
1,480,166
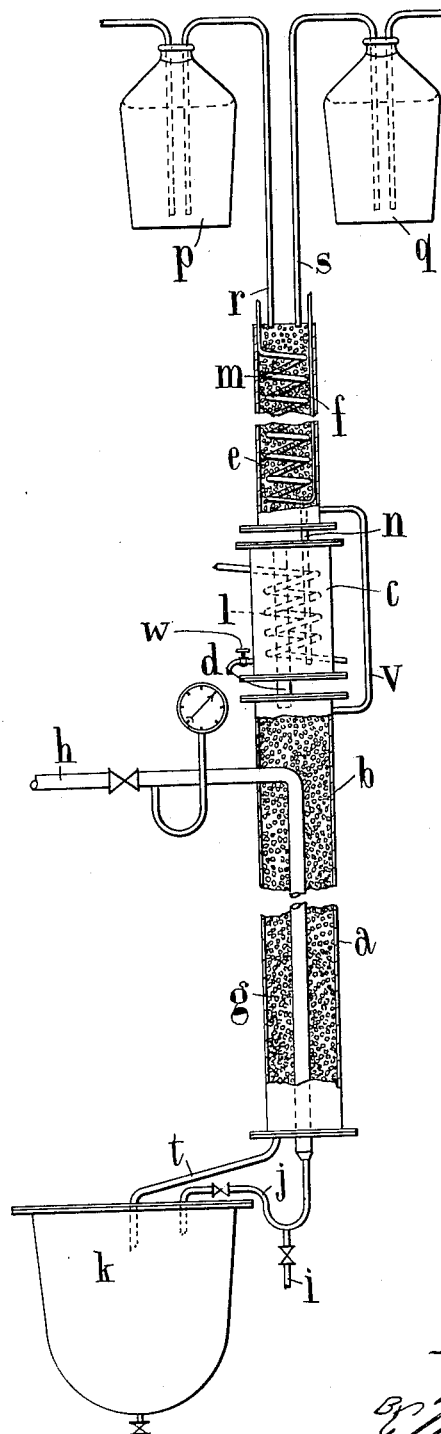
Inventor:
R. A. Joyner Patented Jan. 8, 1924.

1,480,166

UNITED STATES PATENT OFFICE.

REGINALD ARTHUR JOYNER, OF STEVENSTON, SCOTLAND, ASSIGNOR TO E. I. DU PONT DE NEMOURS & COMPANY, OF WILMINGTON, DELAWARE, A CORPORATION OF DELAWARE.

MANUFACTURE OF HYDRAZINE.

Application filed January 18, 1923. Serial No. 613,481.

*To all whom it may concern:*

Be it known that I, REGINALD ARTHUR JOYNER, a subject of the King of Great Britain and Ireland, and residing at Ardeer Factory, Stevenston, Ayrshire, Scotland, have invented certain new and useful Improvements in and Relating to the Manufacture of Hydrazine, of which the following is a specification.

This invention relates to the manufacture of hydrazine.

Several methods are available for the preparation of this substance, but that dealt with in the present application is one commonly employed on the commercial scale utilizing sodium hypochlorite and ammonia with a catalyst which ordinarily takes the form of ordinary glue. The usual way in which this process is operated is to heat a mixture of strong ammonia, glue and dilute sodium hypochlorite solution. The reaction takes place in two stages which may be represented by the equations (1) and (2).

(1) $NaOCl + NH_3 = NH_2Cl + NaOH$.
(2) $NH_2Cl + NH_3 = N_2H_5Cl$.

In the first stage the sodium hypochlorite and ammonia react forming chloramine, and, in the second stage, this chloramine reacts with a further proportion of ammonia to form hydrazine.

Reaction (1) takes place quantitatively, but besides reaction (2) another reaction takes place between the chloramine and ammonia to form ammonium chloride and nitrogen. This reaction may be represented by the equation:

(3) $3NH_2Cl + 2NH_3 = 3NH_4Cl + N_2$.

Reaction (2) only takes place to a large extent when the ammonia is in very large excess and is accelerated by the presence of a catalyst such as glue, otherwise nearly all the chloramine formed in (1) reacts according to equation (3).

The process above described is the subject-matter of Raschig's British Patent No. 139 of 1908.

When the amount of ammonia is limited to that required by the two equations (1) and (2) the yield of hydrazine calculated on the sodium hypochlorite added is only about 5 per cent, even in the presence of glue, while when 20 times that amount of ammonia is employed the yield is 65 per cent.

The manufacture of hydrazine with such a large excess of ammonia by means of the process referred to above necessitates the use of much plant for the evaporation of the excess of ammonia and the condensation of it again in solution of such a concentration that it can be used over again. The method would be discontinuous and would require considerable amount of labor.

The object of the present invention is to provide an improved process whereby greater yields of hydrazine are obtained by ensuring a high local concentration of ammonia at the point where the interaction between the chloramine and ammonia takes place.

Another object of this invention is to provide an improved process whereby a greater output of hydrazine is obtained by the use of a specially prepared catalyst.

A further object of the invention is to provide an apparatus which will enable high yields of hydrazine to be obtained by means of a high local concentration of ammonia and will allow of the same ammonia being passed again and again through the zone of high concentration.

My invention consists, in the first place, in the improvement of the process of preparing hydrazine from ammonia and sodium hypochlorite with the aid of a catalyst, by ensuring the localization of the ammonia used to the region where the reaction is taking place.

The invention also consists in an apparatus for carrying out the process referred to in the preceding paragraph comprising a tower into which the ammonia and hypochlorite can be fed in such a way that they are intimately brought into contact with unused ammonia through a considerable length of the tower and are finally introduced, for the carrying out of the main reaction, into a part of the tower in which they must necessarily remain for a comparatively long time.

The invention also consists in the improved method and in the improved apparatus for the production of hydrazine hereinafter described.

The accompanying diagrammatic drawing represents an apparatus which may be employed according to the present invention.

In carrying the invention into effect in the form illustrated by way of example, a tower suitable for an output of 4 gallons an hour of a dilute solution of hydrazine hydrate is constructed as follows:—

The tower is formed of a cylinder $a$ of iron or like metal which is not attacked by hydrazine. This is conveniently 20 feet high and 4 inches diameter and is packed with pumice $b$ or other suitable packing material. The next section of the tower is a trap $c$ of about 1 gallon capacity and of the same diameter as the lower portion of the tower. A pipe $d$ leads from approximately the top of this trap to the top of the lower section $a$ and it may pass internally through the trap as shown. Above the trap is a further section $e$ about 6 feet high and four inches diameter which is also packed with pumice or other suitable packing material $f$.

In the bottom section $a$ a 1-inch iron tube $g$ adapted to be joined to a steam supply pipe $h$ enters the tower about a yard from the top of the section $a$ and passes straight down through the centre of it emerging from the bottom. There it is provided with branch ways with cocks, one $i$ for the purpose of acting as a blow-off and the other $j$ for connection with a covered hydrazine receiver $k$ suitably placed below the tower into which receiver hydrazine liquor flows from the section $a$ by way of the pipe $t$. By means of this aforesaid pipe $g$ steam heating may be employed for warming the section $a$ of the tower on starting.

The trap or middle section $c$ of the tower is provided with a coil $l$ for the circulation of cooling or warming fluid as desired. The top section $e$ of the tower has fitted therein another cooling coil $m$.

The top and middle sections are joined by a pipe $n$ passing from a place near the bottom of the top section $e$ to the vicinity of the bottom of the middle section $c$. The top and lowest sections are joined by an external pipe or side tube $v$ passing from the bottom of the top section to the top of the bottom section. Above the top of the column two feed tanks $p$ and $q$ are arranged, one ($p$) of which contains a mixture of catalyst and dilute ammonia of a strength about 1.5 normal as regards ammonia and containing 1.5 gm. of glue per litre. The glue is prepared in the following way:—

Two litres of 20% glue solution containing 65 gms. of hydrochloric acid gas are boiled under a reflux for one hour, then sodium hydroxide solution is added till the mixture is alkaline to phenolphthalein. The concentration of the catalyst is calculated in terms of glue originally present.

The other tank $q$ contains dilute sodium hypochlorite of about 0.8 normal. From these vessels the liquids are fed down the tower by the pipes $r$ and $s$ respectively at constant and equal rates.

In starting the process after the tower has been heated up by the pipe $g$ and coil $l$, a strong solution of ammonia, say 18 per cent, is poured down the top section $e$ till the middle section or trap $c$ is full. For this purpose one of the aforesaid feed vessels $p$ or $q$ may be used or that may be disconnected and a separate vessel utilized or again a third connection may be made.

The trap $c$ is allowed to warm until its temperature is about 40° C., after which the liquids from the feed vessels are allowed to run in. The reaction begins to take place at the bottom of the top section $e$ which functions mainly as an ammonia absorption column and is completed in the middle section or trap $c$.

The reacting liquors pass through tortuous passages in the top section formed, for example, by the pumice packing $f$ in intimate contact and after that they complete the reaction as indicated in the middle section $c$ in which, although the passages are not tortuous, they stay for some time, as the liquor gradually falls from the top section $e$ into the middle section $c$, being led into the bottom of that section and trickles out from this section $c$ by way of the top thereof to the lower section $a$. If this middle section be dispensed with there is a danger of the ammonia being expelled before the reaction is complete. As the strong ammoniacal solution flows down the bottom portion $a$ of the tower the ammonia is expelled and passes up through the side tube $v$ connecting the top and bottom sections $e$ and $a$ respectively and is re-dissolved in the liquid flowing down the top section $e$.

By this means the concentration of the ammonia in the trap is maintained at about 18 per cent.

When once the process is started the trap maintains its own temperature and must generally be cooled so that the temperature is kept between 40 and 45° C. After some time the amount of ammonia in the system is more than can be dissolved and a little of the trap liquor is run off as by the drain cock $w$ of the trap $c$. This ammonia can be used for making up fresh solutions for the feed tank.

Instead of having a pipe $g$ carrying steam to heat up the bottom section of the tower steam may be passed into the hydrazine receiver and may be allowed directly to pass up into this bottom section and indeed through the tower as a whole by way of the lead $t$ which normally conveys the hydrazine from the tower to the receiver. In this case the products of the reaction are diluted considerably by the steam condensed.

The yield of hydrazine obtained by the use of this apparatus is about 65 per cent of the theoretical possible from the sodium hypochlorite used. This result is obtained with an overall ratio of molecules of ammonia to chlorine of about four to one, theory requiring two to one, while to obtain the same yield hitherto a ratio of 45 to 1 was required.

The yield of hydrazine on the ammonia consumed is also high, being about 70 per cent.

On keeping the concentration of the ammonia in the trap at about 18 per cent and on lessening the concentrations of the ammonia and the sodium hypochlorite in the feed tanks so that one tank contains about a 1.2 normal solution of ammonia with 1.5 gm. of glue per litre and the other tank contains about a 0.6 normal solution of sodium hypochlorite, the yield of hydrazine rises to about 73 per cent calculated on the sodium hypochlorite used. An increased yield on the ammonia consumed also results, being now about 80 per cent. On account of the dilution of the reaction substances the contents of hydrazine in the liquid emerging at the bottom of the tower is lowered.

In the method described above no distillation of the reaction product is necessary. The process is continuous, the proportion of ammonia used is relatively small and the labor costs are reduced.

It will be noted that in the present process although the excess ammonia, advisable to use in the carrying on of the second reaction, i. e. that between the chloramine formed in the first reaction, and the ammonia, is present, this excess ammonia is not provided until the second reaction is substantially about to take place. That is, the first reaction takes place in the top section $e$ without substantial excess of ammonia, and it is not until the reacting substances reach the trap that the excess ammonia for preventing the formation of ammonium chloride is provided. In this way, all those complications, such as excessive amounts of ammonia, a necessarily discontinuous process, and so on, which are inherent in a process in which the excess ammonia, and the hypochlorite are initially mixed, are avoided. Furthermore, as is evident, the ammonia in the trap is, in practical effect, a stationary body through which the reacting materials flow, so that this ammonia practically does not have to be handled at all, it serving as a sort of catalyst or ammonia atmosphere, promoting the desired reaction. Thus the labor incident to adding all the ammonia in a vessel with hypochlorite and then having to distill it off at the end is eliminated. Of course, there is a flow through the trap $c$, but, as is evident with the ammonia concentration in the trap $c$ not falling, and this body of ammonia always being separate from the portion $e$, the excess ammonia is in practical effect stationary as regards travel of the materials from $p$ and $q$ through the system. The portion $a$ serves as a fractionating column delivering ammonia to the trap through the tube $v$. Since, when proceeding as herebefore indicated, with ammonia 1.5 normal and hypochlorite .8 normal fed at equal rates, the amount of ammonia becomes more than can be dissolved, it is advisable to draw off a little of the trap liquor, as herebefore referred to.

Having now described my invention, what I claim as new and desire to secure by Letters Patent is:—

1. In the process for producing hydrazine by the reaction between ammonia and a hypochlorite in the presence of a catalyst, the steps of initiating the reaction without material excess of ammonia, and then passing the reacting substances into a body of concentrated excess ammonia, thus to provide, without material excess of ammonia in the initial reaction, for the reaction between the chloramine and ammonia in a high local concentration of ammonia.

2. In the process for producing hydrazine by the reaction between ammonia and a hypochlorite in the presence of a catalyst, the steps of initiating the reaction without material excess of ammonia, and then passing the reacting substances into a body of excess ammonia of a concentration of about 18%, thus to provide, without material excess of ammonia in the initial reaction, for the reaction between the chloramine and ammonia in a high local concentration of ammonia.

3. The continuous process of producing hydrazine by the reaction between ammonia and a hypochlorite in the presence of a catalyst which comprises continuously flowing together the hypochlorite, and catalyst and dilute ammonia, without material excess of ammonia, thereby initiating the reaction, and then flowing the reacting substances into and through a practically stationary body of concentrated excess ammonia thus to provide, without material excess of ammonia in the initial reaction, for the reaction between the chloramine and ammonia in a high local concentration of ammonia, and continuously removing the hydrazine from the body of concentrated ammonia.

4. The continuous process of producing hydrazine by the reaction between ammonia and a hypochlorite in the presence of a catalyst which comprises continuously flowing together the hypochlorite, and catalyst and dilute ammonia, without material excess of ammonia, thereby initiating the reaction, and then flowing the reacting substances into and through a practically stationary body of excess ammonia, of a concentration of about 18% and at a temperature substantially between 40° and 50° C., thus to provide without material excess of ammonia in the initial reaction, for the reaction between the chloramine and ammonia in a high local concentration of ammonia, and continuously removing the hydrazine from the body of concentrated ammonia.

In testimony whereof I have signed my name to this specification.

REGINALD ARTHUR JOYNER.